United States Patent [19]

Davis et al.

[11] 4,430,807

[45] Feb. 14, 1984

[54] PROCESS FOR DRYING WATER-WET MEMBRANES

[75] Inventors: Thomas E. Davis, Lafayette; Dana C. Overman, III, Pleasant Hill, both of Calif.

[73] Assignee: The Dow Chemical Company, Midland, Mich.

[21] Appl. No.: 378,973

[22] Filed: May 17, 1982

[51] Int. Cl.$^3$ .......................... F26B 3/00; F26B 5/04; B01D 59/10
[52] U.S. Cl. ............................................ 34/9; 55/16; 34/15
[58] Field of Search ............................ 34/9, 15; 55/16

[56] References Cited

U.S. PATENT DOCUMENTS

| | | | |
|---|---|---|---|
| 3,415,038 | 12/1968 | Merten et al. | 55/16 |
| 3,534,528 | 10/1970 | Porter | 55/16 |
| 3,842,515 | 10/1974 | MacDonald et al. | 34/9 |
| 4,068,387 | 1/1978 | Manos | 34/9 |
| 4,080,743 | 3/1978 | Manos | 34/9 |
| 4,080,744 | 3/1978 | Manos | 34/9 |
| 4,120,098 | 10/1978 | Manos | 34/9 |
| 4,130,403 | 12/1978 | Cooley et al. | 55/16 |

OTHER PUBLICATIONS

Vos et al., *I & EC Prod. Res. & Dev.*, vol. 8, No. 1, pp. 84–89, (1969).
Gantzel et al., *Ind. Eng. Chem. Proc. Des. Dev.*, vol. 9, No. 2, pp. 331–332, (1970).
Matsui et al., "Gas Permeation Properties of Cellulose Triacetate Hollow Fiber Membrane", Symposium, (1980).

*Primary Examiner*—John J. Camby
*Attorney, Agent, or Firm*—M. L. Glenn

[57] ABSTRACT

An improved process for drying water-wet, cellulose ester membrane is described. It has been found that by contacting one side of the membrane with a liquid mixture of a water-miscible, volatile $C_1$ to $C_6$ hydrocarbon and a water-immiscible organic compound, while an inert gas stream or vacuum is maintained on the other surface of the membrane, water can be displaced from the membrane economically, rapidly and without adversely affecting the structure of the membrane. A 1 to 1 volume mixture of isopropanol and isooctane is particularly preferred in this step. The essentially water-free membrane is then dried by applying reduced pressure or an inert gas stream to produce a membrane having exceptional separation characteristics.

8 Claims, No Drawings

PROCESS FOR DRYING WATER-WET MEMBRANES

BACKGROUND OF THE INVENTION

This is an improved process for drying a cellulose ester membrane.

It is well known in the art that water-wet membranes are first advantageously dried to afford the best properties for the separation of gaseous mixtures. Numerous techniques for drying water-wet membranes, while minimizing adverse effects on the membrane properties, are taught in the prior art. U.S. Pat. No. 3,842,515 teaches the sequential treatment of a water-wet, cellulose acetate membrane with a non-polar organic liquid at less than ambient temperatures. It is disclosed therein that the solvents can be introduced into the bores of hollow fibers. U.S. Pat. No. 4,068,387 teaches that the membrane can be dried by treatment with a volatile aliphatic hydrocarbon having specific solubility parameters. Optionally, it is disclosed in column 4 that the solvents can be pumped through the bores of hollow fibers. U.S. Pat. No. 4,080,743 discloses the immersion of a water-wet membrane in a mixture of water-miscible and immiscible liquids followed by drying in an air stream. U.S. Pat. No. 4,080,744 teaches the treatment of a membrane with a solvent which cannot dissolve all of the water present in the membrane. U.S. Pat. No. 4,127,625 describes the treatment of the membrane with a solution of salt followed by freeze drying.

In general, the aforementioned processes for drying membranes have been time-consuming and yielded membranes having variable permeabilities. Accordingly, a more rapid and predictable process for drying water-wet membranes would be advantageous.

SUMMARY OF THE INVENTION

An improved method for drying a water-wet, cellulose ester membrane has been discovered. In accordance with this method a liquid mixture compatible with the membrane is brought into contact with a first side of the membrane. The liquid mixture comprises (a) a first component, which is a volatile $C_1$ to $C_6$ hydrocarbon in which water is soluble to at least ten weight percent and (b) a second component, which is essentially water-immiscible, has a solubility parameter of no greater than about 9.5 and exhibits poor hydrogen bonding. The composition of the liquid mixture and the chemical potential across the membrane are such that the first component in preference to the second component pervaporates through the membrane. The liquid in contact with the membrane should have a lower chemical potential for water than the membrane itself.

After a predominant amount of the water initially present in the water-wet membrane has been removed from the membrane, the composition of the liquid mixture in contact with the membrane is adjusted so that the quantity of the second component which pervaporates through the membrane exceeds the quantity of the first component pervaporating through the membrane. When the membrane is essentially free of water and the first component of the liquid mixture, the membrane is removed from contact with the liquid mixture. The membrane is then treated to remove essentially all residual liquid remaining in the membrane.

It has been found that the subject drying method produces a membrane having a more consistent permeability than the prior art techniques, particularly immersion in a liquid mixture. Moreover, the membrane can be dried in the device to be used for separation, which contributes to the speed and convenience of the drying operation. Finally, much less solvent is used in drying than in prior art immersion techniques.

DETAILED DESCRIPTION OF THE INVENTION

The term "membrane" as used herein encompasses flat film, spiral wound and hollow fiber membranes. Hollow fiber membranes present special problems in drying when they are assembled in bundles. The instant method is particularly effective for drying hollow fibers.

Cellulose ester membranes are well known in the prior art. As manufactured, these membranes contain relatively large amounts of water, as much as 70 weight percent water for asymmetric cellulose ester hollow fiber membranes. In order to dry these membranes while maintaining a membrane structure conducive to the optimum separation properties, it is essential to remove water from the membrane without disrupting the internal structure or discriminating layer of the membrane.

Preferred cellulose esters for use as membranes are cellulose acetate, cellulose diacetate, cellulose triacetate, cellulose propionate, cellulose butyrate, cellulose cyanoethylate, cellulose methacrylate and mixtures thereof. Mixed esters of cellulose, such as cellulose acetate butyrate, mixed cellulose acetates and cellulose acetate methacrylate, are also operable. A commercial cellulose triacetate, containing from about 42.7 to about 44 weight percent acetate, is the material of choice for the subject membranes. Of course, the membrane may also contain minor amounts of plasticizers, lubricants, permeability modifiers, fillers and other materials employed in the art to improve or modify membrane properties.

The subject method is operable with either homogeneous or asymmetric membranes, both of which are described in considerable detail in the prior art. The homogeneous membranes have essentially uniform density. Either side of a homogeneous membrane can be brought in contact with the liquid mixture in the practice of this method, but where the membrane is a hollow fiber the liquid is advantageously introduced into the bore. The asymmetric membranes comprise a thin discriminating layer generally less than one micron thick and a much thicker, relatively porous sublayer. This porous sublayer advantageously contacts the liquid mixture in the instant process. The total thickness of both membranes is desirably thin enough to give good permeation flux, but must also possess adequate membrane strength and good selectivity.

Annealing, i.e., treating the water-wet membrane in warm water (65° to 85° C.), may improve the ultimate selectivity of either homogeneous or asymmetric membranes as is known in the art. It is generally advantageous to anneal both asymmetric and homogeneous cellulose ester membranes before drying.

In a particularly preferred embodiment of this invention, water-wet asymmetric cellulose ester hollow fibers are dried by the subject method. Such hollow fibers are described in U.S. Pat. Nos. 3,133,132, 3,283,042, 3,842,515, 4,080,743 and 4,127,625, the relevant portions of which are incorporated herein by reference.

Step (a)

The liquid mixture in contact with the first side of the membrane must be compatible with the membrane, i.e., it must not deleteriously affect the integrity or properties of the membrane. If the membrane is asymmetric in structure, the liquid mixture should contact the more porous side of the membrane. The first component of the liquid mixture is a hydrocarbon having from 1 to about 6 carbon atoms in which water is soluble to the extent of at least about 10 weight percent at 20° C. This first component must pervaporate through the membrane significantly more rapidly than the second component and must diffuse and vaporize rapidly enough that a high concentration of the first component does not collect in the membrane or on the second side of the membrane.

Representative water-miscible compounds suitable as first components include $C_1$ to $C_4$ alkanols, diethyl ether, methoxyethylene glycol, methoxydiethylene glycol and methoxypropylene glycol. Particularly preferred compounds include $C_1$ to $C_4$ alkanols and dialkyl ethers having from 2 to 6 carbon atoms. Isopropanol is most preferred as the first component. The first component can, of course, include a miscible mixture of the aforementioned compounds.

The second component is soluble in water to the extent of less than about 5 weight percent at 20° C., but is miscible in the first component at the temperature and other conditons at which the liquid mixture contacts the membrane. This second component should have a solubility parameter of 9.5 $(cal/cm^3)^{0.5}$ or less, preferably from about 7.3 to about 9.5, and poor hydrogen bonding as described in the table on page IV-337 of the Polymer Handbook, 2nd Edition, edited by J. Brandrup and E. H. Immergut, John Wiley and Sons (1975). Advantageously this component of the liquid mixture should readily pervaporate through the membrane, but not as facilely as the first component. Representative compounds which can be used as this second component include $C_4$ to $C_8$ alkanes, $C_4$ to $C_8$ alkenes, $C_4$ to $C_8$ alicyclic compounds, benzene, toluene, $C_1$ to $C_6$ chlorinated hydrocarbons and $C_1$ to $C_6$ chlorinated and fluorinated hydrocarbons. Particularly preferred as the second component are isomers of octane, hexane and heptane or mixtures thereof. Isooctane is the compound of choice for use as the second component.

Initially the liquid mixture contacting a very wet membrane should consist of the first component and second component in a ratio such that the first component predominantly pervaporates through the membrane. However, a sufficient quantity of the second component must be present so that is diffuses from the liquid mixture into the membrane to prevent deleterious swelling of the membrane which can otherwise occur.

Dependent on the relative ease with which the first and second components of the liquid mixture diffuse through the membrane wall, the optimum range of compositions for the liquid feed may vary. To illustrate, if the first component diffuses through the fiber wall at a rate ten times that of the second component at equivalent conditions, a liquid feed containing a predominant amount of the second component might be used until most of the water is removed. On the other hand, if the first component diffuses at only a slightly faster rate than the second component, it may be desirable to use a large excess of the first component. The optimum composition of the liquid mixture will depend on the identity of the first and second components, the specific cellulose ester and other factors. Accordingly, no universally applicable guidance on the composition of this mixture can be given. One skilled in the art can readily determine the optimum composition of the liquid mixture empirically. Typically, preferred compositions will contain the first and second components in ratios from about 20:80 volume percent to about 80:20 volume percent, more preferably 40:60 to 60:40.

Water will diffuse from the membrane into the liquid mixture in contact with the membrane. This water can be removed from the liquid as necessary by methods known in the art to promote continued diffusion of water from the membrane. For example, a portion of the liquid mixture can be removed and distilled or treated with drying agents and then recycled. Of course, it may be necessary to add make-up solvents to the solvents recycled. Monitoring the water present in this liquid mixture and the rate of diffusion of water from the membrane provides a useful indication of the water remaining in the membrane.

The composition of the liquid mixture in contact with the membrane should be regulated so that an advantageous composition of the liquid mixture is maintained essentially continuously even as components of the mixture diffuse into the membrane. Since the most rapid diffusion of the organic components into the hollow fiber walls and the greatest extraction of water is likely to occur in the initial period of contact, it is advantageous that the liquid mixture be exchanged with a fresh liquid mixture or be otherwise adjusted as necessary to maintain the desired composition. For reasons of convenience and to assure consistent results, it is generally desirable to utilize a liquid mixture feed which does not vary greatly in composition during the first stage of the drying process.

In a preferred embodiment of this invention a hollow fiber is dried by passing the liquid mixture down the bore of the hollow fiber. Operable flow rates in this embodiment will vary over a wide range. Also the composition of the liquid mixture will change as it passes through the fiber bore.

The temperature employed in this and other steps of the subject drying process is not generally critical, so long as the properties of the membrane are not deleteriously affected. Generally, a temperature in the range from about 5° C. to about 80° C. is operable, with an operating temperature of from about 15° C. to about 35° C. being preferred.

If the concentration of the first component of the liquid mixture becomes so great as to cause substantial and irreversible disruption of the internal membrane structure or swelling of the cellulose ester membrane, the permeability of the hollow fiber when dry can be affected adversely. To avoid an excessive concentration of the first component of the liquid mixture in the walls of the membrane, it is necessary to promote pervaporation of said component through the membrane. Transport is promoted by maintaining a lower chemical potential on the surface of the membrane not in contact with the liquid. See U.S. Pat. No. 4,218,312, which describes pervaporation in some detail. The relevant portions of this patent are incorporated herein by reference.

An inert gas stream is preferably swept over the surface of the membrane opposite the surface in contact with the liquid mixture to maintain the desired difference in chemical potential across the membrane. The gas stream should be of sufficient volume and velocity to prevent accumulation of the first component in the walls or on the surface of the membrane. The gas stream is desirably essentially inert to the cellulose ester and the components of the liquid mixture. Dry air or dry nitrogen are preferred as sweep gases. Alternatively, a vacuum may be maintained external to the membrane to encourage transportation of the first component through the membrane.

Step (b)

After sufficient water has been removed from the membrane so that the separation properties of the dry fiber would not be adversely affected if the remaining water in the membrane were displaced completely by the second component of the liquid mixture, the composition of the liquid mixture is adjusted so that the second component of the liquid mixture predominates in the material pervaporating through the membrane. The amount of residual water which may be present when this stage is intiated will depend on the specific cellulose ester employed, the composition of the liquid mixture and membrane and other factors. Generally, it is desirable to remove at least half of the water initially present in the membrane in step (a). Typically, the membrane should contain no more than about 20 weight percent water, preferably no more than about 10 weight percent water, more preferably no more than 5 weight percent water, when step (b) is initiated.

The composition of the liquid mixture is varied to achieve a predominance of the second component of the liquid mixture in the material pervaporating through the membrane. A sweep gas or a reduced pressure are used as necessary to promote pervaporation. This change in composition of the liquid can be readily achieved by exchange with the composition in contact with the membrane. However, it is generally desirable that the composition of the liquid be changed gradually. Where the volume of the liquid mixture is relatively small, the first component of the liquid is preferably allowed to pervaporate without replenishment to produce a liquid mixture containing predominantly the second component of the original mixture. This result can be achieved with hollow fibers by simply ceasing to pump the liquid mixture down the bore of the fiber. Ultimately, this liquid mixture will consist essentially of the second component of the liquid.

Step (c)

The liquid mixture used in Step (b) is kept in contact with the membrane until the membrane is essentially free of both water and the first component of the liquid mixture. The term "essentially free" as used herein denotes that the quantity of water and the first component of the liquid still present in the membrane will not have a substantial adverse impact on the membrane properties when these materials are removed by pervaporation. Because of the affinity of water and the first component for the cellulose ester, it is difficult to remove these materials from the membrane completely in the foregoing steps. Generally, the membrane should contain a total of less than 10 percent, preferably less than 5 percent, most preferably less than 2 percent, water and the first component of the liquid mixture, when the membrane is removed from contact with the liquid.

Step (d)

The membrane can conveniently be dried under reduced pressure, by an inert sweep gas on both sides of the membrane or by an inert gas on one side of the membrane while reduced pressure is maintained on the other side of the membrane. Removal of the residual liquid from the membrane by other techniques known in the art is also operable, so long as the separation properties and integrity of the membrane are not adversely affected. The membrane can also be dried during its use in the separation of gases; however, this is not generally desirable as the separated gases will be contaminated with residual liquid and the membrane may significantly shrink while in service which may compromise the separation achieved with this membrane due to the creation of leaks between the membrane and any rigid structure which engages the membrane to form a seal.

In one preferred embodiment of this invention an assembled separation device is dried as described herein. For desciptions of some assembled separation devices, see U.S. Pat. Nos. 3,228,876, 3,455,460 and 4,061,574, which describe hollow fiber bundles. The membrane can then be treated by bringing a compatible liquid mixture into contact with the more porous surface of the membrane in the disclosed manner, while concurrently sweeping the other surface of the membrane with an inert gas. Failure to use a sweep gas to remove the permeating liquid deleteriously affects properties of the resulting membrane, particularly where the membrane is packed in a tight configuration such as a hollow fiber bundle or tubular membrane. In the foregoing manner a large number of hollow fibers or a tubular membrane having a large surface area can be treated at the same time. Care must be taken designing the membrane assembly to permit a small amount of shrinkage as the membrane is dried without adversely affecting the membrane.

The time required to dry a membrane depends on a number of factors including the water content of the membrane, the composition of the liquid mixture introduced into the membrane and the configuration of the membrane being treated. The water content of the membrane can be determined by monitoring the water removed frm the membrane or by analyzing a sample of the membrane by conventional methods. Using a preferred liquid mixture made up of isooctane and isopropanol in a volume ratio of 1:1, a bundle of 100,000 hollow fibers treated with the liquid mixture pumped into the fiber bores with an air sweep of the external surface of the fiber for typically 0.25 to 2 hours followed by an air sweep of the fiber external surfaces for typically at least from 4 to 12 hours yields a fiber bundle having excellent gas permeabilty.

The method of drying as described herein produces a membrane having unexpectedly high permeation flux. A dry cellulose ester membrane produced in accordance with these teachings will generally have a $CO_2$ permeation flux measured at a pressure differential of 50 psi between the feed gas and permeate of at least twice that attained with a membrane prepared from an identical water-wet membrane dried in the same manner except that no special effort is made to maintain a lower chemical potential on the side of the membrane not in contact with the liquid. If the structure of a dry cellulose triacetate hollow fiber is not disrupted by drying, it will display a $CO_2$ permeation flux of at least about $1 \times 10^{-5}$ $$\frac{cm^3 \,(STP)}{cm^2 \,sec\, cm\, of\, Hg},$$

more preferably about $6 \times 10^{-5}$, at 20° C. and a pressure differential between feed and permeate of about 50 pounds per square inch (psi). The separation factor of the membrane dried by the subject method also will generally be better.

Membranes rendered dry by the instant method are useful in a variety of gas separation applications. These membranes are particularly useful in the separation of $CO_2$ from methane and other components of natural gas at temperatures of from 10° to −10° C.

The following examples are presented to illustrate the invention:

EXAMPLE 1

A hollow fiber of cellulose triacetate having an inside diameter of 90 microns and an outside diameter of 250 microns is spun via a conventional spinning process into air, quenched in water for about 3 seconds at about 4° C. and then treated in water at 18° C. for 45 seconds to remove most of the plasticizer. This fiber is spun from a solution of 40 weight percent cellulose triacetate and 60 weight percent of a mixture of 78 weight percent tetramethylene sulfone and 22 weight percent of a polyethylene glycol having a molecular weight of about 400. U.S. Pat. No. 3,532,527 describes a similar spinning process. The fiber is then annealed at 80° C. for about 1.5 minutes. The resulting fiber contains about 65 weight percent water.

Water-wet hollow fibers of the aforementioned description are assembled on a perforated fiberglass pipe in essentially parallel orientation, the bundle containing about 100,000 fibers. The perforated pipe is assembled in three axial sections, which will undergo a reduction in length as the hollow fibers shrink. A tubesheet made from a diglycidyl ether of bisphenol A cured with a modified aliphatic amine solid by Pacific Anchor Chemical under the trade name SURWETR is formed close to each end of the hollow fiber bundle, said tubesheets being about 36 inches apart. The aforementioned curing agent is preferred because it results in superior adhesion to fibers relative to most other curing agents. The resulting fiber bundle is inserted in a casing such that the tubesheets sealingly engage said casing.

Dry air is pumped into the perforated fiberglass, two-piece core of the hollow fiber bundle so that the air circulates around the external surfaces of the hollow fibers before being exhausted through outlets in the casing. Air is introduced at a rate in the range from about 23.5 to about 27 standard cubic feet per minute.

Concurrent with the introduction of air, a 1:1 mixture by volume of isopropanol and isooctane is introduced into the bores of the hollow fibers at one end of the bundle. This liquid mixture is introduced at a pressure of 40 psig.

Analysis by gas chromatograph of air exhausted from the outlets in the casing 13 minutes after air is first introduced indicates the presence of isopropanol and water, but no isooctane was detected. Analysis of the air exhaust 31 minutes after the air is first introduced, indicates 7.171 percent isopropanol and 0.543 percent isooctane on an uncalibrated area percent basis. After another 30 minutes analysis of the air exhaust detected 10.04 percent isopropanol and 0.809 percent isooctane on an uncalibrated area percent basis.

The liquid passing through the hollow fibers is analyzed by means of a gas chromatograph 24 minutes after pumping was initiated. The liquid is determined to contain 10.32 percent water, 50.64 percent isopropanol and 35.43 percent isooctane on an uncalibrated area percent basis. After 23 more minutes had elapsed, the liquid passing through the fibers is found to contain 0.724 percent water, 56.59 percent isopropanol and 42.64 percent isooctane on an uncalibrated area percent basis. After 61 minutes from the time pumping was initiated, the liquid leaving the column is analyzed and found to contain 0.377 percent water, 56.57 percent isopropanol and 40 percent isooctane.

The pumping of liquid into the fiber bores is terminated 64 minutes after it was begun. The passage of air across the external surface of the hollow fibers is continued for another 24 hours. During the last several hours of this treatment, the hollow fiber bores are essentially free of liquid.

The gas separation of the resulting dry, asymmetric cellulose acetate hollow fiber bundle is tested at a temperature of 20° and a feed pressure of 50 psig with pure methane and pure carbon dioxide. The carbon dioxide permeation flux in units of $cm^3/(sec.cm^2.cm$ of mercury) is determined to be $2.14 \times 10^{-4}$. The calculated carbon dioxide/methane separation factor is 29.7.

EXAMPLES 2-4

In a manner otherwise similar to Example 1, the flow rate of the air passed over the external surface of the fibers while drying is varied. The resulting hollow fiber bundles are then tested as described in Example 1 and the results tabulated in Table I.

TABLE I

| Example | Air Flow (SCFM) | Permeation Flux $CO_2$ | Separation Factor $CO_2/CH_4$ |
|---|---|---|---|
| 1 | 23.5 to 27 | $21.4 \times 10^{-5}$ | 29.7 |
| 2 | 20 | $16.2 \times 10^{-5}$ | 26.0 |
| 3 | 12 | $9.7 \times 10^{-5}$ | 24.8 |
| 4 | 4 to 5 | $3.9 \times 10^{-5}$ | 21.1 |

While the separation of actual mixed gases of $CO_2$ and $CH_4$ might produce a somewhat lower permeation flux and separation factor at each flow rate, the relationship between air flow rate and the permeation flux exhibits the same trend.

What is claimed is:

1. A method for drying a water-wet, cellulose ester membrane, which comprises the steps of:
   (a) contacting a first side of the membrane with a liquid mixture compatible with the membrane, said liquid mixture comprising a first component which is a $C_1$ to $C_6$ hydrocarbon in which water is soluble to at least ten weight percent and a second component which is essentially immiscible in water, has a solubility parameter of no greater than about 9.5 $(cal/cm^3)^{0.5}$ and exhibits poor hydrogen bonding, said contact with the liquid occurring while the other side of the membrane is swept with an inert gas or maintained at a reduced pressure relative to the first side of the membrane so as to maintain essentially continuously a lower chemical potential for the first component of the liquid mixture on the second side of the membrane, the composition of the liquid mixture being such that (1) the first component of said mixture pervaporates through the membrane more rapidly than the second component and (2) the liquid in contact with the membrane has a lower chemical potential for water than the membrane itself;

(b) after a predominant amount of the water initially present in the water-wet membrane has been removed from the membrane, adjusting the composition of the liquid mixture in contact with the membrane so that the quantity of the second component which pervaporates through the membrane exceeds the quantity of the first component pervaporating through the membrane;

(c) removing the liquid mixture from contact with the membrane after the membrane is essentially free of both water and the first component of the liquid mixture; and (d) treating the membrane to remove essentially all residual liquid remaining in the membrane.

2. The method as described in claim 1 wherein the resulting dry cellulose ester membrane has a $CO_2$ permeation flux measured at a pressure differential of 50 psi between the feed gas and permeate of at least twice that attained with a membrane which is prepared from an identical water-wet membrane dried in the same manner except that a sweep gas or reduced pressure is not employed to maintain a lower chemical potential on the side of the membrane not in contact with the liquid mixture.

3. The method as described in claim 2 wherein the membrane is an asymmetric cellulose acetate, cellulose diacetate or cellulose triacetate membrane.

4. The method as described in claim 3 wherein the water-wet membrane is a spiral-wound membrane.

5. The method as described in claim 3 wherein the water-wet membrane is a bundle of hollow fibers.

6. The method as described in claim 3 wherein the first component of the liquid mixture is a $C_1$ to $C_4$ alkanol or $C_2$ to $C_6$ dialkyl ether.

7. The method as described in claim 6 wherein the second component of the liquid mixture is isooctane, n-hexane or n-heptane.

8. The method as described in claim 7 wherein the ratio of the first to the second component of the liquid mixture is in the range from 40:60 to 60:40 volume percent.

* * * * *